United States Patent
Heyng

Patent Number: 5,890,980
Date of Patent: Apr. 6, 1999

[54] TOOTHED BELT DRIVE GEAR FOR A MOTOR VEHICLE WHEEL

[76] Inventor: Wolfgang Heyng, Im Turm 35, 58675 Hemer, Germany

[21] Appl. No.: 933,669

[22] Filed: Sep. 19, 1997

[30] Foreign Application Priority Data

Sep. 23, 1996 [DE] Germany ................ 196 38 877.5

[51] Int. Cl.⁶ .................................................. F16H 55/17
[52] U.S. Cl. .......................... 474/158; 180/219; 474/152
[58] Field of Search ............................ 474/148, 150, 474/151, 152, 158; 188/73.46, 344; 180/219

[56] References Cited

U.S. PATENT DOCUMENTS

| | | | |
|---|---|---|---|
| 2,659,220 | 11/1953 | Cherry | 474/158 X |
| 2,879,871 | 3/1959 | Van Ranst | 474/158 X |
| 5,224,572 | 7/1993 | Smolen, Jr. et al. | 188/218 XL |
| 5,431,241 | 7/1995 | May et al. | 180/197 |
| 5,526,889 | 6/1996 | Neary | 474/1 X |
| 5,725,464 | 3/1998 | Pallmann | 483/1 |
| 5,728,019 | 3/1998 | Becker et al. | 474/94 |

FOREIGN PATENT DOCUMENTS

| | | |
|---|---|---|
| 2110515 | 9/1971 | Germany. |
| 25 10 640 A1 | 9/1976 | Germany. |
| 37 13557 A1 | 10/1987 | Germany. |
| 3729813 A1 | 3/1989 | Germany. |
| 4-327057 (A) | 3/1993 | Japan. |

Primary Examiner—Thomas R. Hannon
Attorney, Agent, or Firm—Panitch Schwarze Jacobs & Nadel, P.C.

[57] ABSTRACT

A toothed belt drive gear (1) for a motor vehicle wheel, especially a pulley wheel for a motorcycle, is connected rotation-fast with the hub of a drive gear and has an outer rotating toothed ring (5). In order to facilitate the maintenance and care of the vehicle wheel and to avoid endangering the toothed belt by braking heat, the invention proposes that the toothed belt drive gear (1) has axial surfaces constructed as braking surfaces (2') of a disk brake (2), wherein the connection between the braking surfaces (2') and the toothed ring (5) has a low heat conductivity.

15 Claims, 3 Drawing Sheets

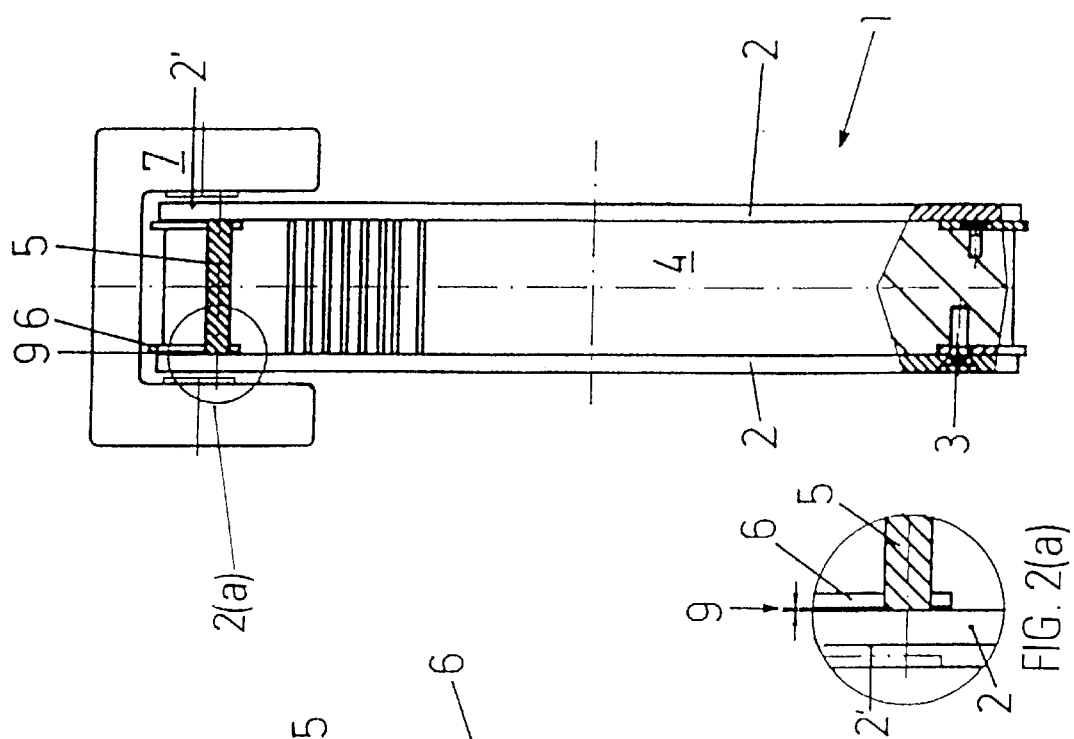
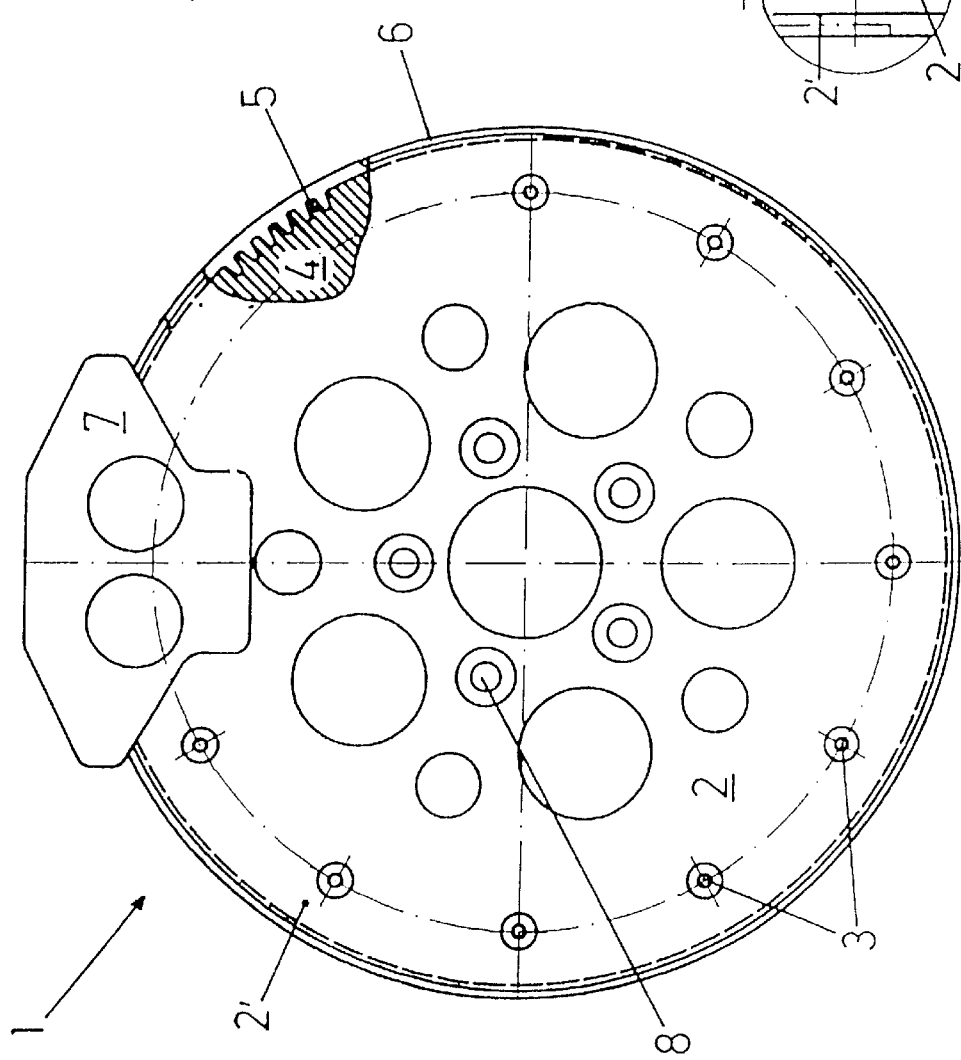

TOOTHED BELT DRIVE GEAR FOR A MOTOR VEHICLE WHEEL

BACKGROUND OF THE INVENTION

The invention concerns a toothed belt drive gear for a motor vehicle wheel, especially a pulley wheel for a motorcycle, which is connected rotation-fast with the hub of the drive wheel and which has an outer rotating toothed ring.

The secondary drive with motorcycles, that is the transmission of torque from the gearing exit to the driven rear wheel, generally takes place through a Cardan shaft, a chain or even a toothed belt. The toothed belt drive is especially convenient here, since it practically combines the good transmission characteristics of the chain with the maintenance friendliness and durability of a Cardan drive.

The driven rear wheel has, in addition to the drive gear, on which the toothed belt runs, a braking facility. Either drum brakes with brake drums incorporated into the wheel hub or disk brakes, whose brake disk is likewise fastened rotation-fast with the wheel hub, are used as brakes. For higher demands, disk brakes are preferred which have a better braking performance in comparison with drum brakes and above and beyond this are relatively maintenance-friendly.

The especially promising combination of a toothed belt drive with a disk brake requires, however, that the toothed belt drive gear, also designated as pulley wheel, as well as the brake disk be attached rotation-fast on the hub of the drive wheel. The previously preferred technical solution provides here for arranging the pulley wheel on the one side and the brake disk on the other side of the rear wheel. This construction, however, also produces basic disadvantages: Thus, accessibility of the rims, spokes and hub for the purpose of maintenance and upkeep is made equally difficult from both sides, namely by the pulley wheel on the one hand and by the brake disk on the other. In addition, rear wheels built up in this way are often felt to be unaesthetic. Moreover, maintenance and upkeep are made difficult by the fact that in disassembling and assembling the rear wheel, it is necessary to monitor simultaneously the installation of the toothed belt on the one side and the fitting of the brake disk into the brake caliper on the other side.

With chain drives it has already been attempted to install a brake disk on the rear chain wheel. This solution nevertheless could not be successful, as there existed the danger that the brakes could be fouled by chain grease. One has up until now completely refrained from mounting a brake disk on the pulley wheel of a toothed belt drive, because brake disks become so hot in operation that the toothed belt would be unavoidably subjected to damage by the heat acting on it.

BRIEF SUMMARY OF THE INVENTION

From this background arises the object of the invention of making available a pulley wheel, that is a toothed belt drive gear for a motor vehicle wheel, which facilitates the maintenance and care of the motor vehicle wheel, and thereby avoids endangering the toothed belt by brake heat.

For accomplishing this object, the invention proposes that the toothed belt drive gear have axial surfaces constructed as braking surfaces of a disk brake, wherein the connection between the braking surfaces and the toothed ring has a low heat conductivity.

The invention proceeds from the fact that with the disk brake integrated into the toothed belt drive gear according to the invention, mechanical connections necessarily exist between the brake surfaces and the toothed ring. These connections have in accordance with the invention, however, such a high heat transfer resistance that braking heat which arises on the braking surfaces, which is not directly drawn off by air cooling, merely passes regulated to such a small extent into the toothed ring that this cannot heat up above the allowable operating temperature of the toothed belt. Conveniently, the heat conductivity of the connection between the braking surfaces and the toothed ring is less than that of the connection between the braking surfaces and the wheel hub of the vehicle wheel. The braking heat arising is thereby preferably diverted to the wheel hub. The small amount of heat transferred into the toothed ring by the low heat conducting connection only leads to a slight warming up of the toothed belt, so that the highest allowable operating temperature for the toothed belt is not exceeded.

The particular advantage of the configuration of the invention having the toothed belt drive gear with integral braking surfaces lies in the fact that the vehicle wheel can be comfortably accessed from the side lying opposite the drive. The maintenance and care of the spokes and the rim are thereby considerably eased. In addition, an especially successful overall impression from an aesthetic perspective results.

A preferred embodiment of the invention provides that the braking surfaces are located on a brake disk arranged inside the toothed ring, wherein the brake disk is connected with the toothed ring through a narrow radial bar. The radial bar is dimensioned such that, in comparison with the quantity of heat drawn off by air cooling or to the hub of the vehicle wheel, only a relatively small proportion can pass through the relatively small bar cross-section.

In this connection, it is expedient that the narrow radial bar have axial openings between brake disk and toothed ring. In this way, the heat conducting cross-section of the bar is diminished even further, and air cooling is improved at the same time so that the amount of heat conducted into the toothed ring is correspondingly smaller.

Since the brake disk is connected with the hub through a larger heat conducting cross-section than with the toothed ring, the arrangement results in heat preferably flowing to the hub and not to the toothed ring.

The brake disk is preferably constructed to be ventilated from within. In this way, one obtains an especially efficient air cooling so that less braking heat has to be diverted into the toothed ring or the hub by heat conduction.

A preferred embodiment of the invention provides that a heat insulating layer is provided axially in each case between a braking surface and a buffer disk of the toothed ring. In this embodiment the brake disks, that is the braking surfaces, are mounted axially on both sides of the toothed ring. The large diameter of the brake disks thus obtained is particularly suitable with respect to a good braking action. The heat insulation layer positioned between the brake disk and the toothed ring nonetheless prevents braking heat from passing directly over to the toothed ring. Heat diversion takes place much more through the ambient air and the fastening bolts of the brake disk, which lie on the drive gear, for example near the hub.

Alternatively, the heat insulation layer can be formed by an axial air gap, wherein a heat-restraining insulating material is inserted in the gap. This construction with the axial air gap has thereby the particular advantage that, besides the good insulating action, additional cooling is obtained by the air brushing past.

The toothed belt drive gear is preferably made of aluminum. Its low weight is especially advantageous with respect to light unsprung materials. At the same time, modern aluminum alloys have a stability such that even the brake disk can be made of aluminum.

Proceeding from this, it is especially advantageous that the toothed belt drive gear including the brake disk be constructed in one piece. In this embodiment only a single aluminum cast element must be manufactured, which is especially convenient in view of manufacturing costs and expenditures.

The durability of the toothed belt drive gear of the invention is increased in an especially advantageous way, in which the disk brake and/or the toothed ring is given an abrasion-resistant coating. In this way, that hard, wear-resistant coatings are applied to an aluminum surface, especially favorable characteristics are obtained with respect to wear and tear, which are not inferior to those of other materials, for example steel or the like, and lead to an especially long lifetime.

A particularly advantageous refinement of the toothed belt drive gear of the invention provides for the brake disk and/or toothed ring to be coated with heat insulating material. Through this heat insulation coating, for example a heat resistant ceramic coating, which is at the same time particularly wear-resistant, the introduction of heat into the material and also the emission of heat from the material are curbed. If, for example, the surface of the toothed ring with which the toothed belt stands in contact, is provided with a heat-restraining coating, this surface, and therefore the toothed belt, is then not heated in an impermissible manner in case (for example owing to unfavorable operating conditions) the underlying material should be heated above the maximum permissible temperature. Moreover, suitable coatings, for example ceramic coatings, are distinguished for the purposes mentioned, owing to special hardness and thereby wear resistance of the surface.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 depicts a toothed belt drive gear of the invention in a first embodiment in axial view;

FIG. 2 shows the toothed belt drive gear in accordance with FIG. 1 in a radial view;

DETAILED DESCRIPTION OF THE INVENTION

Figure 3:
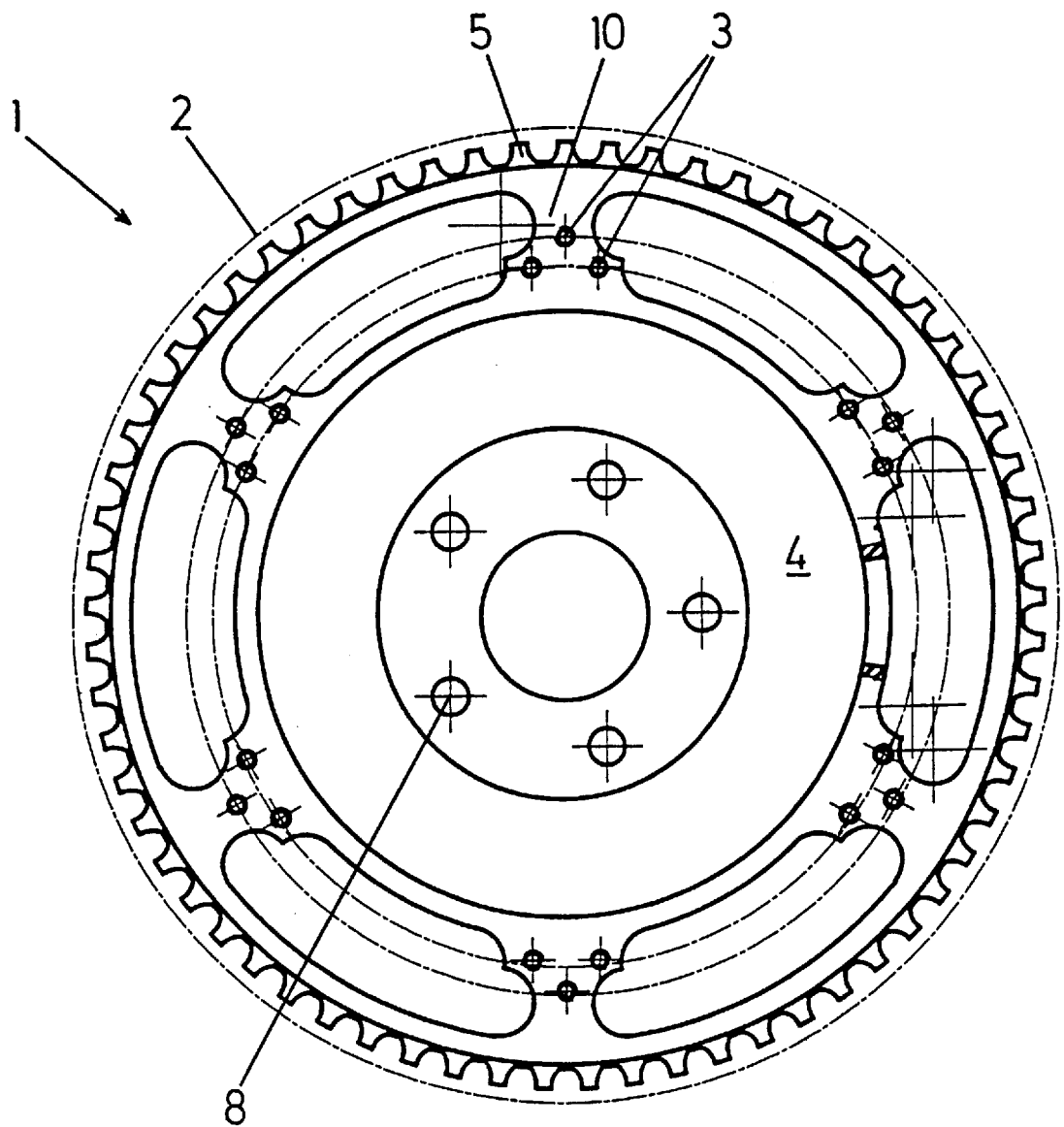
FIG. 3 illustrates the toothed belt drive gear of the invention in a second embodiment.

The toothed belt drive gear as a whole is provided with the reference numeral 1 in FIG. 1. In the view depicted one is looking axially at a brake disk 2. This is screwed axially onto a toothed belt gear 4 by means of bolts 3 distributed over its compass, which is partially recognizable in the schematically cut away representation. Outside, the toothed belt gear 4 has a rotating toothed ring 5.

Between the brake disk 2 and the toothed belt gear 4 a buffer disk 6 is situated, which projects radially beyond the brake disk 2.

A brake caliper designated with reference number 7 preferably has a two piston or multiple piston braking forceps, which engages the toothed belt drive gear and acts on the axially outer-lying braking surfaces 2' of the brake disk 2.

The toothed belt drive gear 1 is flanged onto the hub (not represented) of a drive wheel by means of bolts (likewise not represented).

FIG. 2 shows a radial view of the toothed belt drive gear 1 from FIG. 1, wherein the same reference numerals are used. From this, the axial succession of the individual structural components emerges particularly clearly. One recognizes how the brake caliper 7 engages the brake disks 2 fastened on both sides of the toothed belt gear 4 on their axially outer-lying braking surfaces 2'. An axial air gap 9 is situated between the brake disks 2 in the region of their braking surfaces 2' and the toothed ring 5 in this embodiment. Its arrangement emerges especially clearly from the detail representation at the lower left in FIG. 2.

FIG. 3 shows an axial view of a toothed belt gear in a second embodiment, which is provided with the reference numeral 4 just as in FIG. 1. The brake disks 2 are likewise installed in a circular shape axially on both sides of the outer-lying toothed ring 5 in this embodiment.

Heat insulation layers are, to be sure, likewise arranged between the brake disks 2 and the toothed belt gear 4 in this embodiment, but these are not represented here. Instead it is recognizable how only narrow connection bars 10 to the toothed ring 5 are present in the region of the fastening bolts 3, while more massive connections with a greater cross-section are present radially toward the inside.

Figure 4:
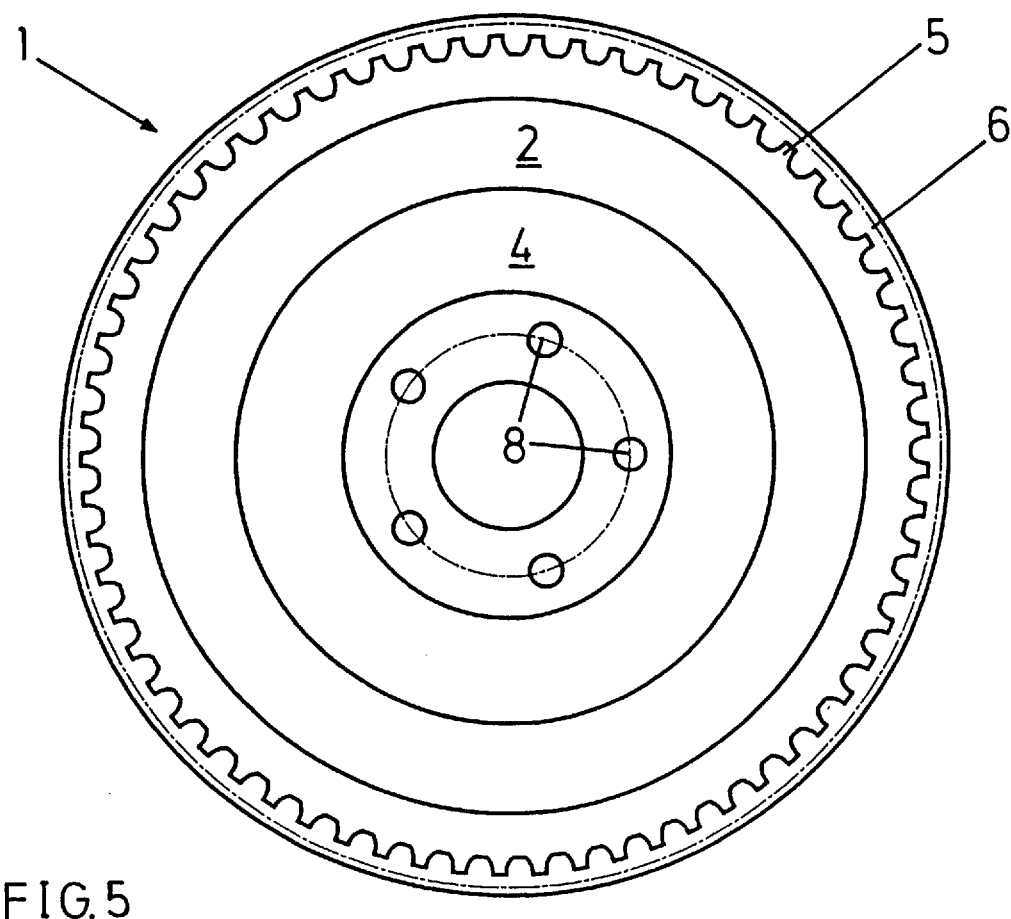
FIG. 4 depicts a toothed belt drive gear of the invention in a third embodiment.
Figure 5:
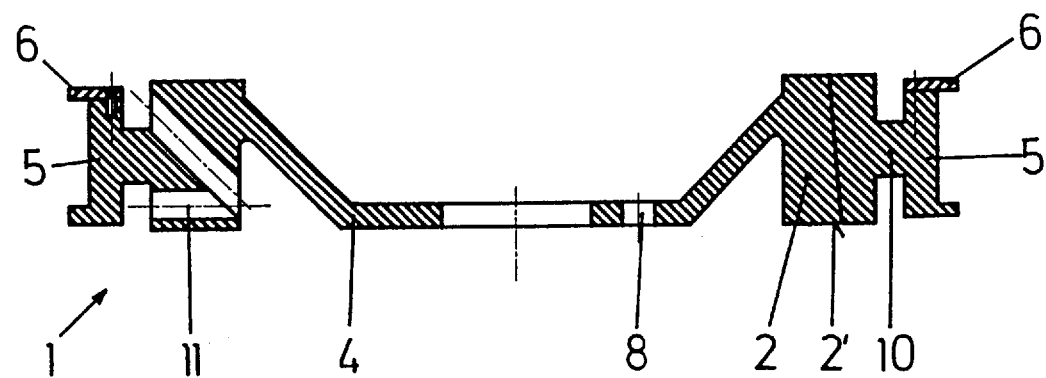
FIG. 5 is a cross-section through the toothed belt drive gear in accordance with FIG. 4.

FIGS. 4 and 5 depict a further construction of a toothed belt drive gear 1 of the invention in axial view as well as in a sectional representation. In this connection, the same reference numerals are used as in the previous Figures.

The embodiment depicted has a brake disk 2 positioned inside the toothed ring 5. This is connected with the toothed ring 5 through a narrow radial bar 10.

The particularities of the embodiment depicted lie in the fact that the toothed belt drive gear 1, including the toothed belt gear 4 and the brake disk 2, is constructed in one piece, for example as an aluminum cast part. Its toothed ring 5 as well as braking surfaces 2' are preferably wear-inhibiting, that is coated wear-resistantly.

Ventilation channels 11 are installed in the interior of the brake disk 2, which provide for an internal ventilation.

All depicted embodiments of the toothed belt drive gear 1 of the invention have in common that the connection between the braking surfaces 2' and the toothed ring 5 has a low heat conductivity. In the embodiments represented in FIGS. 1 and 2 this is achieved in that an air gap 9 is arranged as a heat insulation layer between the brake disks 2 screwed axially on the toothed ring 5 and the buffer disks 6. The heat transfer from the brake disks 2 thereby preferably takes place in the interior region of the toothed belt gear 4.

In the embodiment represented in FIGS. 4 and 5 with a brake disk 2 situated inside the toothed ring 5, the braking heat is first of all diminished by internal ventilation through ventilation channels 11. The remaining heat is drawn off toward the interior and only conducted into the toothed ring 5 through the narrow connection bars 10, whereby this is likewise not heated to an impermissible extent.

The combination in accordance with the invention of disk brakes 2 with a toothed belt drive gear 1 makes it possible for the sides of the drive gear of a motorcycle lying opposite the drive to remain free, that is, the access is not impeded by an additional brake disk.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A toothed belt drive gear for a motor vehicle wheel, which is adapted to be non-rotatably connected with a hub of a drive wheel and which has an outer toothed ring, wherein the toothed belt drive gear (1) has axial surfaces constructed as braking surfaces (2') of a disk brake, the toothed ring being axially located between the braking surfaces (2'), and a connection having a low heat conductivity arranged between the braking surfaces (2') and the toothed ring (5).

2. The toothed belt drive gear according to claim 1, wherein the braking surfaces (2') are situated on a brake disk (2) arranged radially inside the toothed ring (5), and the connection located between the brake disk (2) and the toothed ring (5) comprises a narrow radial bar (10).

3. The toothed belt drive gear according to claim 2, wherein the narrow radial bar (10) between the brake disk (2) and the toothed ring (5) has axial openings.

4. The toothed belt drive gear according to claim 2, wherein the brake disk (2) is connected with the hub through a greater heat conducting cross-section than with the toothed ring (5).

5. The toothed belt drive gear according to claim 1, wherein a heat insulation layer (9) is arranged axially between each of the braking surfaces (2') and the toothed ring (5).

6. The toothed belt drive gear according to claim 5, wherein a buffering disk (6) is located in each case axially between the braking surface (2') and toothed ring (5).

7. The toothed belt drive gear according to claim 1, wherein an axial air gap (9) is arranged between each of the braking surfaces (2') and a buffering disk (6) of the toothed ring.

8. The toothed belt drive gear according to claim 1, wherein heat-restraining insulating material is positioned between one of the braking surfaces (2') and a buffering disk (6).

9. The toothed belt drive gear according to claim 1, wherein the toothed belt drive gear (1) comprises aluminum.

10. The toothed belt drive gear according to claim 9, wherein the braking surfaces (2') are situated on a brake disk (2), and the toothed belt drive gear (1) including the brake disk (2) is constructed in one piece.

11. The toothed belt drive gear according to claim 9, wherein the braking surfaces (2') are situated on a brake disk (2), and at least one of the brake disk (2) and the toothed ring (5) has a wear-resistant coating.

12. The toothed belt drive gear according to claim 1, wherein the braking surfaces (2') are situated on a brake disk (2) which comprises aluminum.

13. The toothed belt drive gear according to claim 1, wherein the braking surfaces (2') are situated on a brake disk (2), and the brake disk (2) is ventilated inside.

14. The toothed belt drive gear according to claim 1, wherein the braking surfaces (2') are situated on a brake disk (2), and at least one of the brake disk (2) and the toothed ring (5) is coated with heat insulation.

15. The toothed belt drive gear according to claim 1, wherein the drive gear (1) is a pulley wheel for a motorcycle.

* * * * *